April 23, 1968
P. E. PORTER
3,378,924
CABLE CUTTING ASSEMBLY
Filed July 26, 1966
3 Sheets-Sheet 1
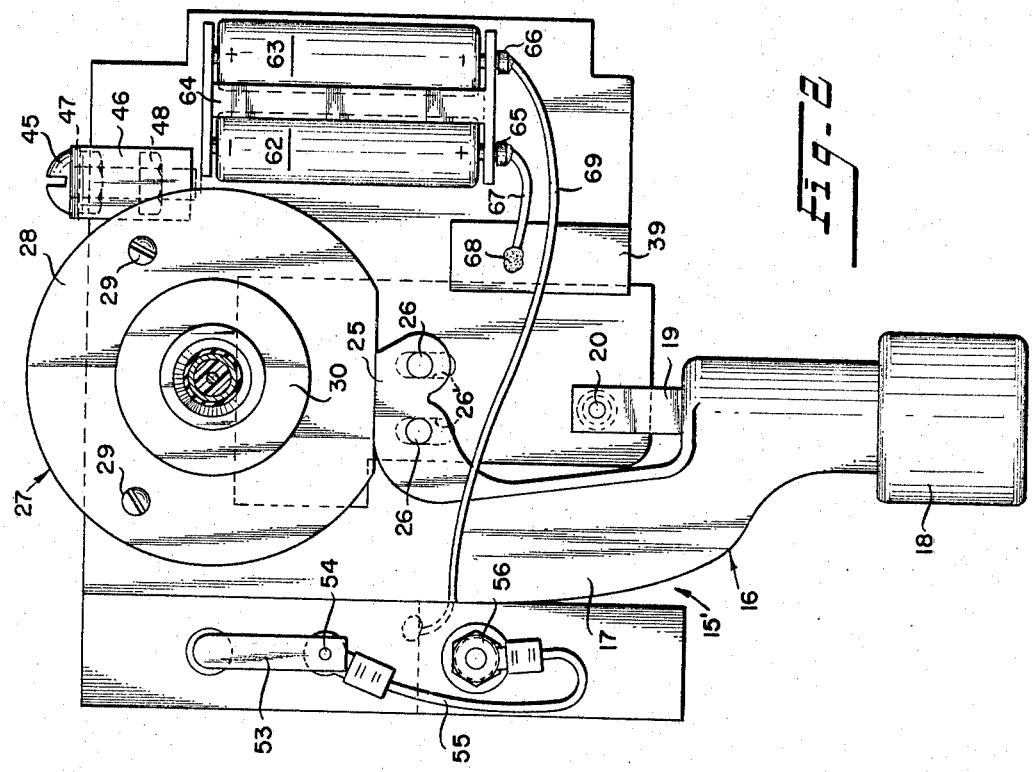
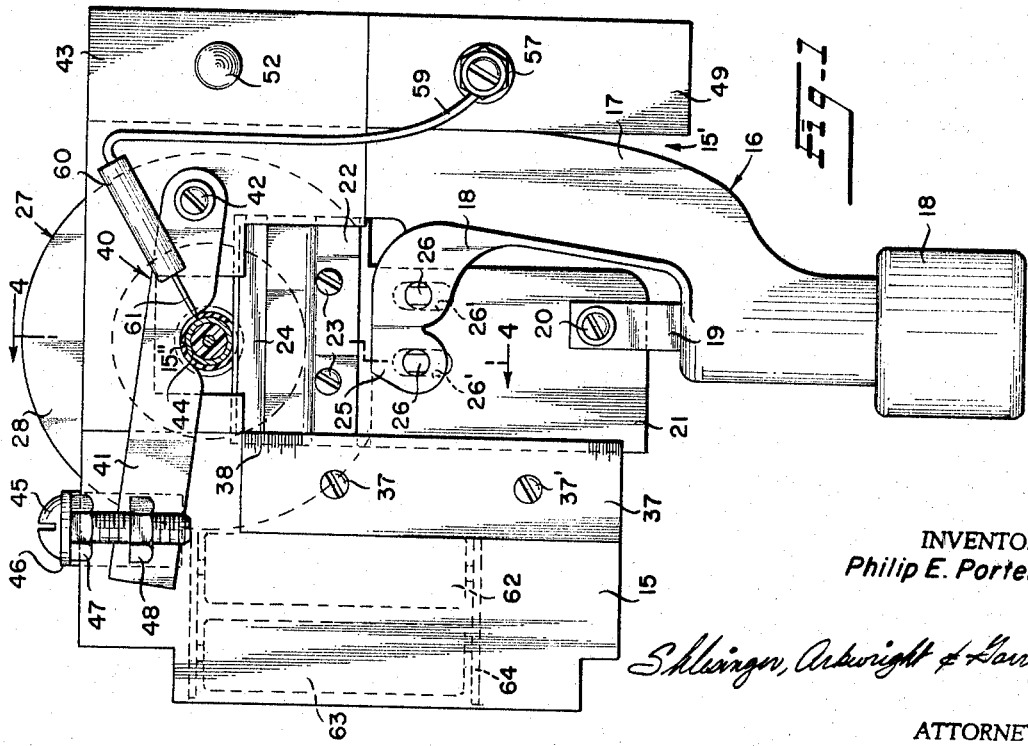
INVENTOR
Philip E. Porter
ATTORNEYS April 23, 1968
P. E. PORTER
3,378,924
CABLE CUTTING ASSEMBLY
Filed July 26, 1966
3 Sheets-Sheet 2
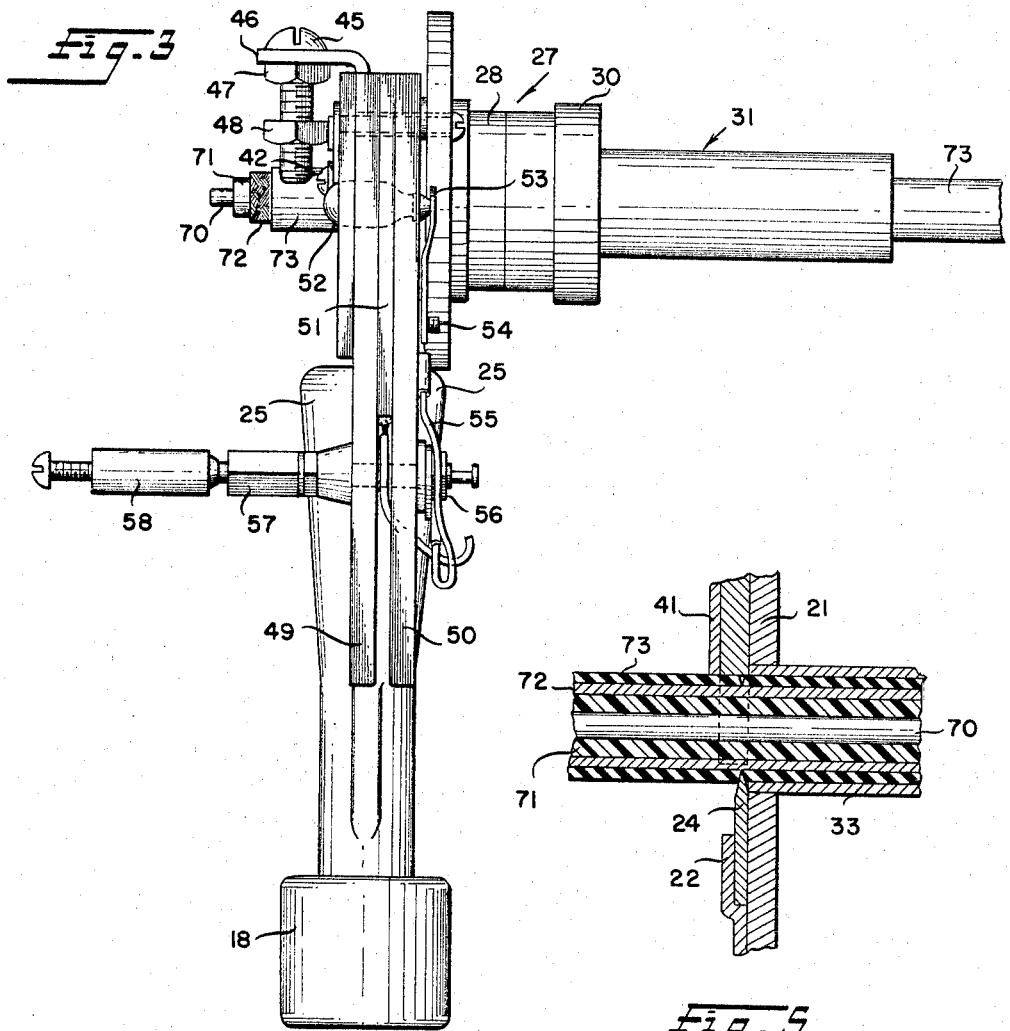
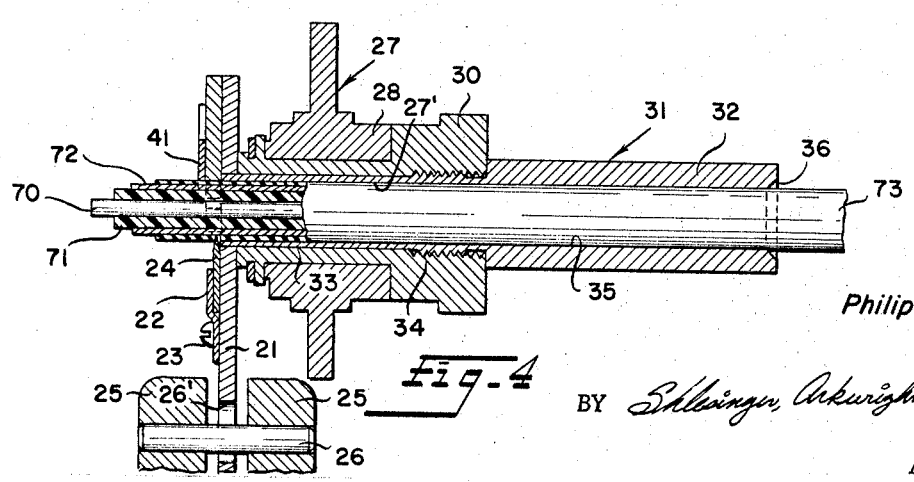
INVENTOR
Philip E. Porter
BY Schlesinger Arkwright & Garvey
ATTORNEYS April 23, 1968   P. E. PORTER   3,378,924
CABLE CUTTING ASSEMBLY
Filed July 26, 1966   3 Sheets-Sheet 3
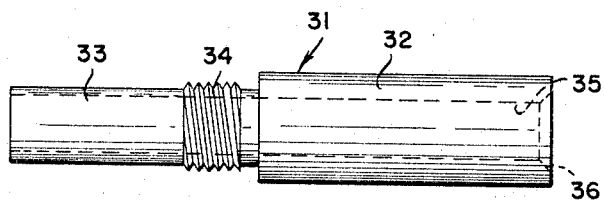
Fig-7
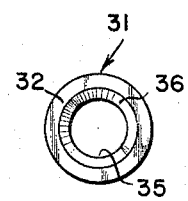
Fig-8
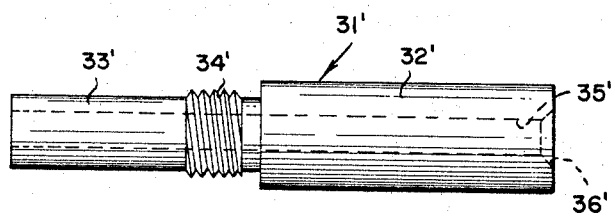
Fig-9
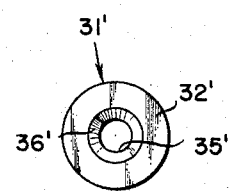
Fig-10
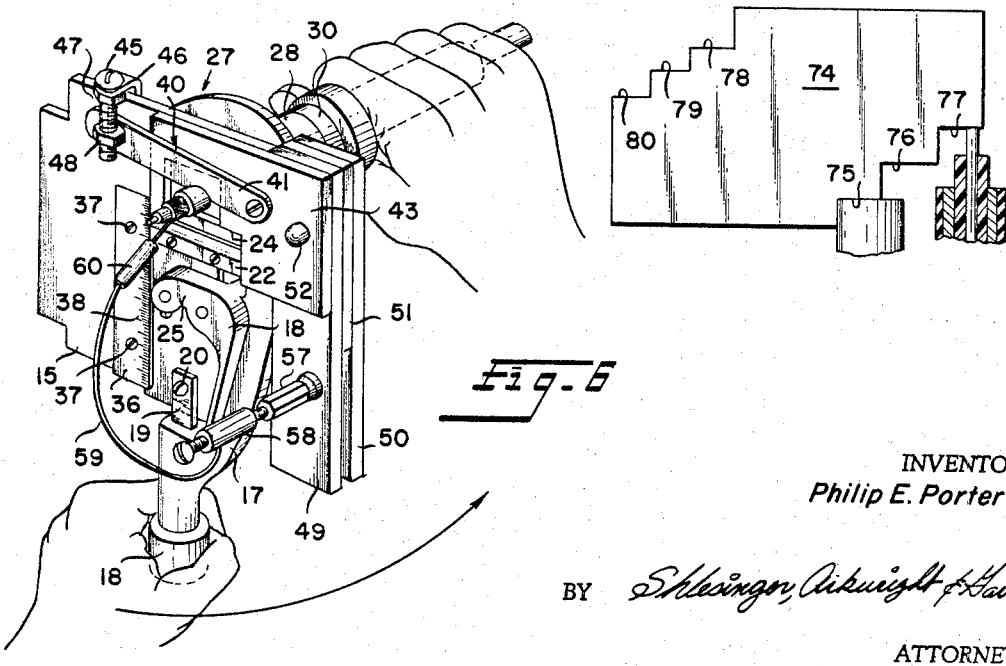
Fig-6
Fig-11
INVENTOR
Philip E. Porter
BY *Shlesinger, Arkwright & Garvey*
ATTORNEYS

United States Patent Office 3,378,924
Patented Apr. 23, 1968

3,378,924
CABLE CUTTING ASSEMBLY
Philip E. Porter, 207 Woodland Drive,
Forest Heights, Md. 20021
Filed July 26, 1966, Ser. No. 567,883
12 Claims. (Cl. 30—91.2)

ABSTRACT OF THE DISCLOSURE

Cable cutting assembly including a base plate, a movable plate positioned adjacent the base plate, a micrometer caliper type member carried by the base plate and engageable with the movable plate for moving the same with respect to the base plate, a cutting element mounted on the movable plate, a cable holder engaged with the base plate for positioning the cable in the path of movement of the cutting element, the cable holder and base plate being relatively rotatable, a cable retainer member adjustably mounted on the base plate, a probe for selective engagement with the cable conductors, signal means in circuit with the probe and cutting element, and a source of electrical energy electrically connected to the signal means for actuating the same upon engagement of the cutting element with the selected cable conductor, to complete the electrical circuit.

---

This invention relates to a cable cutting assembly for insulated electrical wiring or the like, and is particularly adapted for use in cutting layers of coaxial cable individually preparatory to stripping the cut layers from the remainder of the cable.

For many years it has been conventional practice to strip the insulation from an electrical conductor by means of a knife or like implement. This practice often results in nicking or otherwise damaging the conductor with resultant deleterious effects. In more recent years, this problem has become more pronounced with the increased use of coaxial cable in installations, requiring even greater precision in stripping the various layers surrounding the central conductor for engagement with a connector. Stripping of such cable involves a time consuming operation requiring many man hours of work for an installation.

It is an object of this invention to provide a device for mechanically cutting multi-layer electrical conducting cables, the device including a cutting element, and means for precisely determining the depth of penetration of the cutting means into the various layers of the cable.

Another object is to provide a cable cutting assembly which is particularly adapted for use with coaxial cable and includes signal means to indicate when the cutting means has penetrated to the outer surface of the respective conducting members of the cable, thereby avoiding nicking or other damage thereto.

Another object is to provide an assembly of the character described which is adaptable for cutting various sizes of cable, and which securely holds the cable in a manner to effect a squared-off cut, prior to stripping the cut portion from the cable.

A further abject is to provide a cable retainer member adjustably connected to the main body portion of the assembly, to prevent movement of the cable during incising of the cable.

A still further object is to provide a bearing assembly interposed between the tubular holder and the main body portion of the assembly, to permit rotation of the latter about the cable to incise a layer or layers of the cable.

Other objects of the invention are to provide an incandescent bulb in circuit with the cutting member, and a probe, the probe being engaged with a conductor of the cable to effect illumination of the bulb upon contact of the cutting member with the outer periphery of the cable conductor; to provide a template for gauging the length of insulating covering or other material to be stripped, and to provide a tubular cable holder for receiving the cable to be cut and stripped, the tubular holder being removable for replacement with a tubular holder adapted to receive a different-sized cable.

Other objects of the invention will be manifest from the following description of the present preferred form of the invention, taken in connection with the accompanying drawings, wherein:

FIG. 1 is a front elevational view of the cable cutting assembly of the present invention;

FIG. 2 is a rear elevational view of the same;

FIG. 3 is an end elevational view of the same;

FIG. 4 is a sectional view taken along the line 4—4 of FIG. 1, looking in the direction of the arrows;

FIG. 5 is an enlarged view similar to FIG. 4, showing to advantage the engagement of the cutting member with the cable;

FIG. 6 is a perspective view of the cable cutting assembly of the present invention, illustrating its use;

FIG. 7 is a side elevation view of a tubular cable holder forming a part of the present invention;

FIG. 8 is an end elevational view of the tubular cable holder of FIG. 7;

FIG. 9 is a side elevational view of a second tubular cable holder which may be interchangeably employed with the tubular holder of FIG. 7;

FIG. 10 is an end elevational view of the tubular cable holder of FIG. 9, and

FIG. 11 is a plan view of a template, forming a part of the present invention, illustrating its use.

Referring in more detail to the drawings, and more particularly to FIGS. 1 to 3, the assembly of the present invention is principally made of an electrical conducting material such as metal, and includes a flat base plate 15 of substantially rectangular shape. Base plate 15 is provided with a central rescess 15', adjacent which is mounted a micrometer caliper type member 16, having a jaw 17 fixed to member 16, which member terminates in an operating knob 18 for effecting extension and retraction of an arm 19. Arm 19 is fixed at 20 to a second plate 21 which is uniplanar with the base plate and adapted for movement within the central recess of base plate 15.

A removable holder 22 is fixed to the upper extremity of plate 21 by screws or the like 23, which holder is adapted for the reception of a cutting member 24 having a cutting edge extending transversely of plate 21, which is employed to incise a layer or layers of the cable to be stripped. A conventional razor blade is suitable for this purpose.

At a point intermediate the length of plate 21, member 16 is provided with arms 25 extending across a portion of each face of plate 21, which arms are joined by pins 26 which extend through openings 26' in plate 21. Arms 25 serve to stabilize plate 21 during movement thereof relative to plate 15.

At a point adjacent cutting element 24, base plate 15 is provided with a circular opening 15'' which is aligned with a bore 27' extending through a bearing assembly 27, which is fixed to the rear face of base plate 15. Bearing assembly 27 includes a stationary member 28 fixed at 29 to base plate 15. The assembly further includes a member 30 which is rotatable in stationary member 28 in a well known manner.

It is within the contemplation of the present invention to provide a tubular cable holder 31 which is adapted for engagement with bearing assembly 27. Holder 31 is shown to advantage in FIGS. 7 and 8, and includes an enlarged portion 32 and a reduced portion 33, a part of the outer periphery of the latter adjacent enlarged portion 32 being threaded at 34 for engagement with complemental threads of rotatable member 30 of the bearing assembly. A bore 35 extends through holder 31 and the outer terminal of enlarged portion 32 is beveled at the locus of the bore as indicated at 36 to facilitate training of the cable to be stripped through the holder. The diameter of bore 35 is substantially the same as the outer periphery of the cable to be cut and stripped, so that the cable is tightly held during the cutting and stripping operation. It will be noted from a consideration of FIGS. 3 and 4 that reduced portion 33 extends through bearing assembly 27 and base plate 15 and that enlarged portion 32 extends outwardly from the rear face of the bearing assembly and serves as a handhold during the cutting and stripping operation.

A scale plate 37 is fixed at 37' to base plate 15 at a point adjacent movable plate 21, which scale is provided with scale markings 38 for indicating the depth of penetration of the cutting element into a cable, when desired. It will be noted from FIG. 1 that an edge of scale plate 36 slightly overhangs movable plate 21 and, in conjunction with a similarly disposed plate 39, FIG. 2, fixed to the rear face of base plate 15, maintains movable plate 21 in uniplanar relationship with stationary plate 15 at all times.

A cable-retainer member for the wire stripper assembly is indicated at 40. Member 40 includes an arm 41, one end of which is pivotally connected at 42 to a spacer plate 43 which is fixed to base plate 15. Intermediate its length, the lower margin of arm 41 is provided with an arcuate recess 44, the upper extremity of which is adapted to be aligned with the upper limit of bore 35 of tubular cable holder 31. Adjustment of arm 41 into proper position is effected by means of an adjustment bolt 45 which is supported by, and extends through, a right angle member 46, which is fixed to the rear face of base plate 15. A nut 47 is threaded on bolt 45 and is drawn up against the underface of right angle member 46 to prevent longitudinal movement of the bolt. A second nut 48 is threadedly engaged with the lower portion of bolt 45, which nut is fixed in any suitable manner to arm 42 as indicated at 49. Rotation of bolt 45 thereby effects movement of arm 41 in an arc about pivot point 42 for adjusting the same to various sizes of cable to be stripped. Arm 41 is positioned until the arcuate portion thereof, defining the recess 44, engages the upper periphery of the coaxial cable, trained through tubular holder 31.

It will be noted from a consideration of FIGS. 4 and 5 that cable-retainer member 40 lies in parallel, spaced relation to base plate 15 and that cutting element 24 operates in the intervening space to incise a layer or layers of the cable. In this manner, the cable is firmly held on both sides of the cut made by element 24 to prevent casual displacement while stripping.

The assembly of the present invention further includes a signal unit for effecting precision stripping of a layer or layers of the cable. This unit comprises a pair of spaced, parallelly arranged insulating blocks 49 and 50, between which is interposed a conducting plate 51. Blocks 49 and 50 and plate 51 are secured together, in any suitable manner, and block 49 is additionally affixed to spacer plate 43. Plate 51 is thereby insulated from the remaining metallic portions of the stripper assembly. An incandescent bulb 52 is mounted in a socket formed by an opening extending through blocks 49 and 50 and plate 51, the outer, illuminating portion of the bulb extending through an opening in spacer plate 43. As shown in FIG. 3, the base of bulb 52 is adapted to engage a contact arm 53 which is fixed to insulating block 50 at 54. A conductor 55 extends from point 54 to an electrical connection 56 which passes through insulating blocks 49 and 50. A socket 57 is engaged with electrical connection 56 and extends outwardly from the front face of insulating block 49. An electrical plug 58 is adapted for insertion into socket 57, which plug is electrically connected by a conductor 59 to a probe 60. Probe 60 includes a terminal pin 61 adapted for selective engagement with the conductors of the coaxial cable.

Incandescent bulb 52 is illuminated by batteries 62 and 63 arranged in series in a battery support 64, having terminals 65 and 66. A conductor 67 extends from terminal 65 to plate 39 where it is soldered at 68. A second conductor 69 extends from terminal 66 and is frictionally held between insulating block 49 and plate 51.

*Operation*

As indicated above, the assembly of the present invention is particularly adapted for use in cutting and stripping a coaxial cable, which cable includes an inner or central conductor 70 which is embedded in an insulation sheath 71. Sheath 71 is covered by a braided conducting shield 72, over which is an outer insulation jacket 73.

In cutting a coaxial cable with the assembly of the present invention, the cable is trained through tubular cable holder 31 until a portion thereof extends beyond the front of the assembly. Cable retainer member 40 is next adjusted until that portion thereof defining arcuate recess 44 is in engagement with the outer periphery of outer insulation jacket 73 of the cable. Pin 61 of probe 60 is then stuck into the terminal of inner conductor 70. Operating knob 18 is next rotated in a direction to advance cutting element 24 into incising engagement with the cable, which element is advanced until it engages the outer periphery of inner conductor 70. When the cutting element engages the conductor, this completes an electrical circuit to illuminate incandescent bulb 52. The operating knob is then preferably turned in an opposite direction until the bulb is extinguished. As shown in FIG. 6, the main body portion of the assembly is then rotated about the cable with one hand, while the other hand holds enlarged handle portion 32 of the tubular cable holder stationary. This effects cutting by element 24 through the three outer layers of the cable and, due to the retention of the cable by member 40, a perfect squared-off cut is effected. After the circular cut has been made in the cable, the cutting element is withdrawn, thereby permitting the outer layers to be removed from central conductor 70 by hand.

The cable is then advanced through the assembly, preparatory to cutting and stripping the outer two layers of the cable from insulation sheath 71. For this purpose, it has been found that best results are obtained by engaging pin 61 of probe 60 with shield 72. Therefore, when cutting element 24 is advanced and the assembly rotated about the cable, bulb 52 is illuminated when the cutting element engages shield 72. Cutting element 24 is then advanced by operating knob 18 a distance corresponding to the thickness of shield 72, as determined by scale markings 38 of plate 36. When the cutting element has been advanced to this extent, rotation of the assembly about the cable is again effected to incise the latter circularly and permit stripping of layers 72 and 73 from sheath 71.

The cable is then advanced again and pin 61 of probe 60 is stuck into shield 72. When the cutting element has been advanced to a point where it engages shield 72, bulb 52 is again illuminated, following which the cutting element is backed off and then rotated about the cable to cut outer jacket 73. The cut portion may then be readily removed to expose shield 72. As shown to advantage in FIGS. 3 and 6, the cable is then in condition for application of a connector thereto.

As above indicated, the assembly of the present invention is adapted for cutting and stripping cables of different sizes by the use of interchangeable tubular cable holders. In FIGS. 9 and 10 there is illustrated such an interchangeable holder which is similar to the tubular holder of FIGS. 7 and 8 and accordingly, like parts thereof are identified by like, primed numbers. It will be noted from a comparison of the tubular holders illustrated in these figures, that the outer dimensions and structure are the same for ready insertion in the assembly. However, the diameter of the bores 35 and 35' respectively are different, to accommodate different-sized cables.

In FIG. 11, there is illustrated a gauge plate 74 which may be employed for determining the length of the layer or layers to be stripped from the cable. Gauge plate 74 is preferably a flat body having a substantial rectilinear edge at the bottom which issues into a series of stepped notches 75, 76 and 77. Similarly, the top of the plate has a substantial rectilinear edge, which issues into a series of stepped notches 78, 79 and 80, the relationship of which notches to each other is different from that of notches 75, 76 and 77.

By placing the rectilinear edge of gauge plate 74 on base plate 15, the length of the various layers of the cable to be removed in each cutting and stripping operation may be rapidly determined, and a corresponding length of the cable pushed beyond the front face of the assembly for cutting by element 24.

The assembly of the present invention affords facile means for precision cutting and stripping of electrical conductor cables for engagement with connectors, with resultant savings in time and energy. Furthermore, by equipping the assembly with a visual signal for indicating engagement of the cutting element with electrically conducting portions of the cable, accidental damage to the conductor is avoided.

While there has been herein shown and described the presently preferred embodiment of the present invention, it is to be understood that such has been done for purposes of illustration only, and that various changes may be made therein within the scope of the claims hereto appended.

I claim:

1. A cable cutting assembly including
   (a) a base member adapted to hold the cable to be stripped,
   (b) a movable member slidable with respect to said base member in a plane at right angles to the cable to be stripped,
   (c) a cutting element fixed to said movable member,
   (d) means for advancing said movable member and cutting element into incising engagement with the cable to be cut,
   (e) probe means for engagement with a conductor, and
   (f) signal means in circuit with said probe means and cutting element, to advise the operator when the cable has been incised to the conductor.

2. The cable cutting assembly of claim 1, with the addition of
   (a) a cable-retainer member attached to said base member,
   (b) said cable-retainer member being positioned for engaging and holding the cable against movement during the incising operation.

3. The cable cutting assembly of claim 1 with the addition of
   (a) a tubular member extending through an opening in said base member,
   (b) the bore of said tubular member being adapted to receive the cable to be cut.

4. The cable cutting assembly of claim 3, wherein
   (a) said tubular member is removable from the base member opening for replacement with a like tubular member having a bore of different internal diameter.

5. The cable cutting assembly of claim 1, wherein
   (a) said signal means is an incandescent bulb.

6. The cable cutting assembly of claim 1, wherein
   (a) said probe means terminates in a pin engageable with a conductor of the cable.

7. The cable cutting assembly of claim 1, with the addition of
   (a) scale means on said base member proximate the cable to be cut and cutting element to measure the depth of penetration of the latter into the cable.

8. The cable cutting assembly of claim 3 with the addition of bearing means interposed between said tubular member and said base member to facilitate relative rotation thereof.

9. A cable cutting assembly including
   (a) a base plate,
   (b) a movable plate positioned adjacent said base plate,
   (c) means carried by said base plate and engageable with said movable plate for moving the latter with respect to the former,
   (d) a cutting element mounted on said movable plate,
   (e) a cable holder engaged with said base plate for positioning the cable in the path of movement of said cutting element, and
   (f) signal means in circuit with said cutting element,
   (g) said signal means being actuated upon engagement of said cutting element with electrical conductor of the cable.

10. The cable cutting assembly of claim 9, with the addition of
    (a) a cable-retainer member mounted on said base plate adjacent said cable holder.

11. The cable cutting assembly of claim 10, wherein said cable-retainer member includes
    (a) an arm in spaced parallel relation to said base plate,
    (b) said arm having an arcuate recess adapted for engagement with the periphery of the cable to be cut, and
    (c) means for positioning said arm to cut different sizes of cables.

12. A cable cutting assembly including
    (a) a base plate having a recess along one side thereof,
    (b) a movable plate positioned in the recess,
    (c) a caliper mounted on said base plate and engageable with said movable plate for moving the latter in the recess with respect to said base plate,
    (d) a cutting element carried by said movable plate,
    (e) a tubular cable holder engaged with said base plate for receiving the cable to be cut and retaining the cable in the path of movement of said cutting element,
    (f) a bearing assembly interposed between said tubular cable holder and base plate for permitting relative rotation of the cable holder with respect to said base plate,
    (g) a retainer member adjustably mounted on said base plate,
    (h) said retainer member being in spaced, parallel relation to said base plate and said cutting element lying in a plane between the retainer member and base plate,
    (i) a probe adapted for selective engagement with the cable conductors,
    (j) signal means in circuit with said probe and cutting element, and
    (k) a source of electrical energy electrically connected to said signal means for actuating the latter upon engagement of said cutting element with the selected cable conductor, to complete the electrical circuit.

References Cited

UNITED STATES PATENTS

| | | | |
|---|---|---|---|
| 2,645,958 | 7/1953 | Geary et al. | 81—9.51 |
| 2,680,394 | 6/1954 | Andren | 81—9.51 |
| 2,765,685 | 10/1956 | Stratman et al. | 81—9.51 |
| 3,071,033 | 1/1963 | Felts | 82—48 |
| 3,095,768 | 7/1963 | Walstrom | 81—9.51 |

MYRON C. KRUSE, *Primary Examiner.*